US012651848B2

(12) United States Patent
Hao et al.

(10) Patent No.: US 12,651,848 B2
(45) Date of Patent: Jun. 9, 2026

(54) ANTENNA SYSTEM AND ELECTRONIC DEVICE

(71) Applicant: Nanning FuLian FuGui Precision Industrial Co., Ltd., Nanning (CN)

(72) Inventors: Jin Hao, Houston, TX (US); Yu-Yuan Guo, New Taipei (TW); Kai-Hao Chen, New Taipei (TW); Liang-Hsien Hung, New Taipei (TW)

(73) Assignee: Nanning FuLian FuGui Precision Industrial Co., Ltd., Nanning (CN)

( * ) Notice: Subject to any disclaimer, the term of this patent is extended or adjusted under 35 U.S.C. 154(b) by 134 days.

(21) Appl. No.: 18/646,599

(22) Filed: Apr. 25, 2024

(65) Prior Publication Data

US 2025/0087899 A1 Mar. 13, 2025

(30) Foreign Application Priority Data

Sep. 12, 2023 (CN) .......................... 202311171409.5

(51) Int. Cl.
| | |
|---|---|
| *H01Q 21/06* | (2006.01) |
| *H01Q 9/04* | (2006.01) |
| *H04B 7/0413* | (2017.01) |

(52) U.S. Cl.
CPC ......... *H01Q 21/065* (2013.01); *H01Q 9/0414* (2013.01); *H04B 7/0413* (2013.01)

(58) Field of Classification Search
CPC .... H01Q 21/065; H01Q 9/0414; H01Q 1/521; H01Q 21/205; H01Q 21/28; H04B 7/0413
See application file for complete search history.

(56) References Cited

U.S. PATENT DOCUMENTS

| | | | |
|---|---|---|---|
| 2012/0007785 A1* | 1/2012 | Amari ................... | H01Q 9/0407 343/722 |
| 2021/0320406 A1* | 10/2021 | Chen .................... | H01Q 21/062 |
| 2022/0344836 A1* | 10/2022 | Caratelli ............... | H01Q 21/28 |
| 2023/0268651 A1 | 8/2023 | Tran | |
| 2024/0304985 A1* | 9/2024 | Ng ......................... | H01Q 5/371 |

FOREIGN PATENT DOCUMENTS

| | | |
|---|---|---|
| CN | 109450496 | 3/2019 |
| CN | 113540790 A | 10/2021 |
| CN | 110892580 B | 12/2021 |

(Continued)

*Primary Examiner* — Regis J Betsch
*Assistant Examiner* — Jose A. Miranda Gonzalez
(74) *Attorney, Agent, or Firm* — ScienBiziP, P.C.

(57) ABSTRACT

An antenna system, installed on a base, includes: a first group of MIMO antennas, including multiple first MIMO antennas, and each first MIMO antenna is provide with a grounding structure and a fence like structure perpendicular to the base; a second group of MIMO antennas, comprising multiple second MIMO antennas, and each second MIMO antenna is a planar structure, arranged on a substrate, and the substrate is fixed to the base through a support column and the substrate is parallel to the base; a third group of MIMO antennas, comprising multiple third MIMO antennas, and each third MIMO antenna includes a dielectric structure and a wire structure perpendicular to the base, and the wire structure excites the dielectric structure; an AUX antenna, provided with a T-shaped slot parallel to the base.

16 Claims, 18 Drawing Sheets

(56)  References Cited

FOREIGN PATENT DOCUMENTS

| | | | | |
|---|---|---|---|---|
| CN | 114188732 | | 3/2022 | |
| TW | I715438 | B | 1/2021 | |
| TW | 202437599 | A | 9/2024 | |
| TW | 202450173 | A | 12/2024 | |
| WO | WO-2009010724 | A1 * | 1/2009 | ............ H01Q 19/09 |

* cited by examiner

300

3001

3002

ANTENNA SYSTEM AND ELECTRONIC DEVICE

FIELD

The present disclosure relates to a technical field of wireless communication technology, in particular to an antenna system and electronic device.

BACKGROUND

The development of Wireless Local Area Networks (WLAN) is most widespread with the Wi-Fi protocol developed by the Wi Fi Alliance. The development of the Wi-Fi protocol has evolved from IEEE 802.11 a, b, g, n, ax to the upcoming 802.11 be, also known as Wi Fi 7, which has made great progress in bandwidth and throughput usage. However, when using such electronic devices in application scenarios such as airports or commercial buildings, problems such as low isolation, high noise interference, uneven signal coverage, and blind spots in reception may occur.

BRIEF DESCRIPTION OF THE DRAWINGS

Many aspects of the present disclosure are better understood with reference to the following drawings. The components in the drawings are not necessarily drawn to scale, the emphasis instead being placed upon clearly illustrating the principles of the present disclosure. It will be appreciated that for simplicity and clarity of illustration, where appropriate, reference numerals have been repeated among the different figures to indicate corresponding or analogous elements.

DETAILED DESCRIPTION

Figure 1:
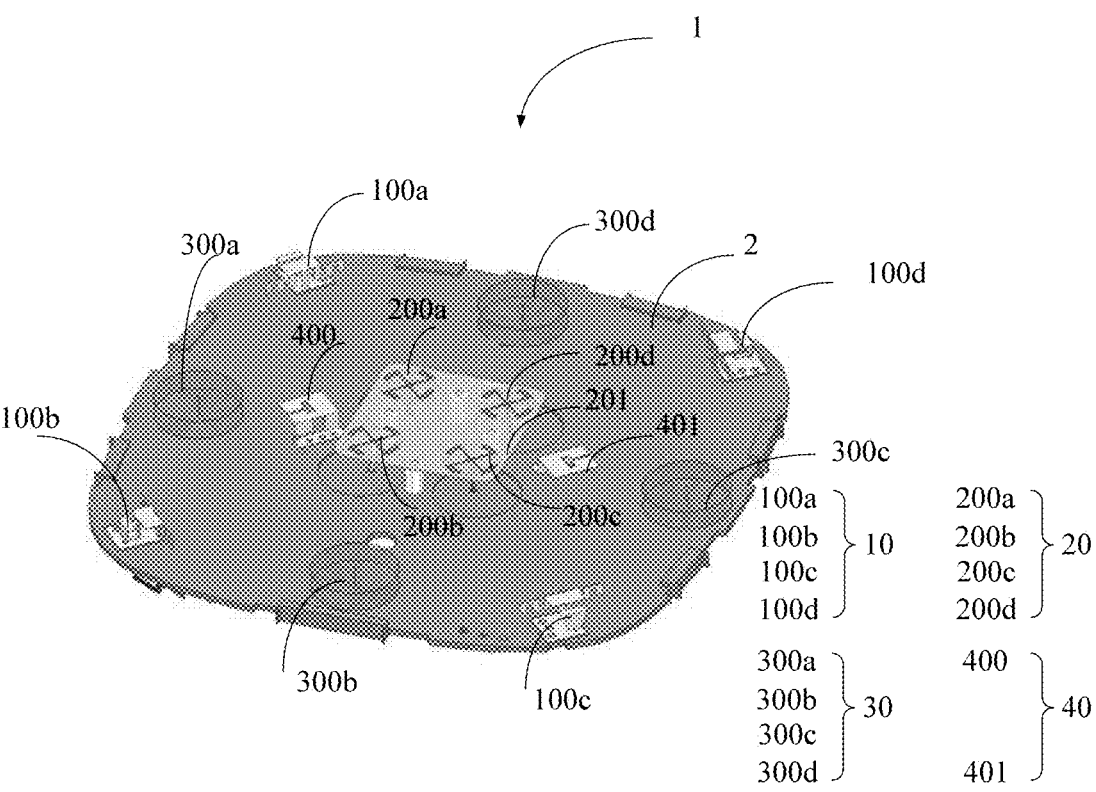
FIG. 1 is a schematic diagram of an optional structure of an antenna system of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one".

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

Referring to FIG. 1, FIG. 1 is a schematic diagram of an optional structure of an antenna system 1 of the present disclosure. The antenna system 1 is mainly used for wireless switch electronic devices, such as AP (Access Point). In the embodiment, the antenna system 1 is installed on a base 2. The antenna system 1 includes a first group of MIMO (Multiple Input Multiple Output) antenna unit 10, a second group of MIMO antennas 20, a third group of MIMO antennas 30, and an AUX (Auxiliary) antenna 40. The first group of MIMO antennas 10, the second group of MIMO antennas 20, and the third group of MIMO antennas 30 are mainly used for WiFi communication, and the AUX antenna 40 is mainly used to search for other WiFi signals in space.

The first group of MIMO antennas 10 includes multiple first MIMO antenna 100. The multiple first MIMO antenna 100 are respectively arranged at four corners of the base 2. In the embodiment, taking four first MIMO antennas 100a, 100b, 100c, and 100d as examples, but not limited. The first MIMO antennas 100a, 100b, 100c, and 100d are respectively arranged at four corners of the base 2, and each first MIMO antenna is provide with a grounding structure G1 and a fence like structure S1 perpendicular to the base 2.

Figure 2:
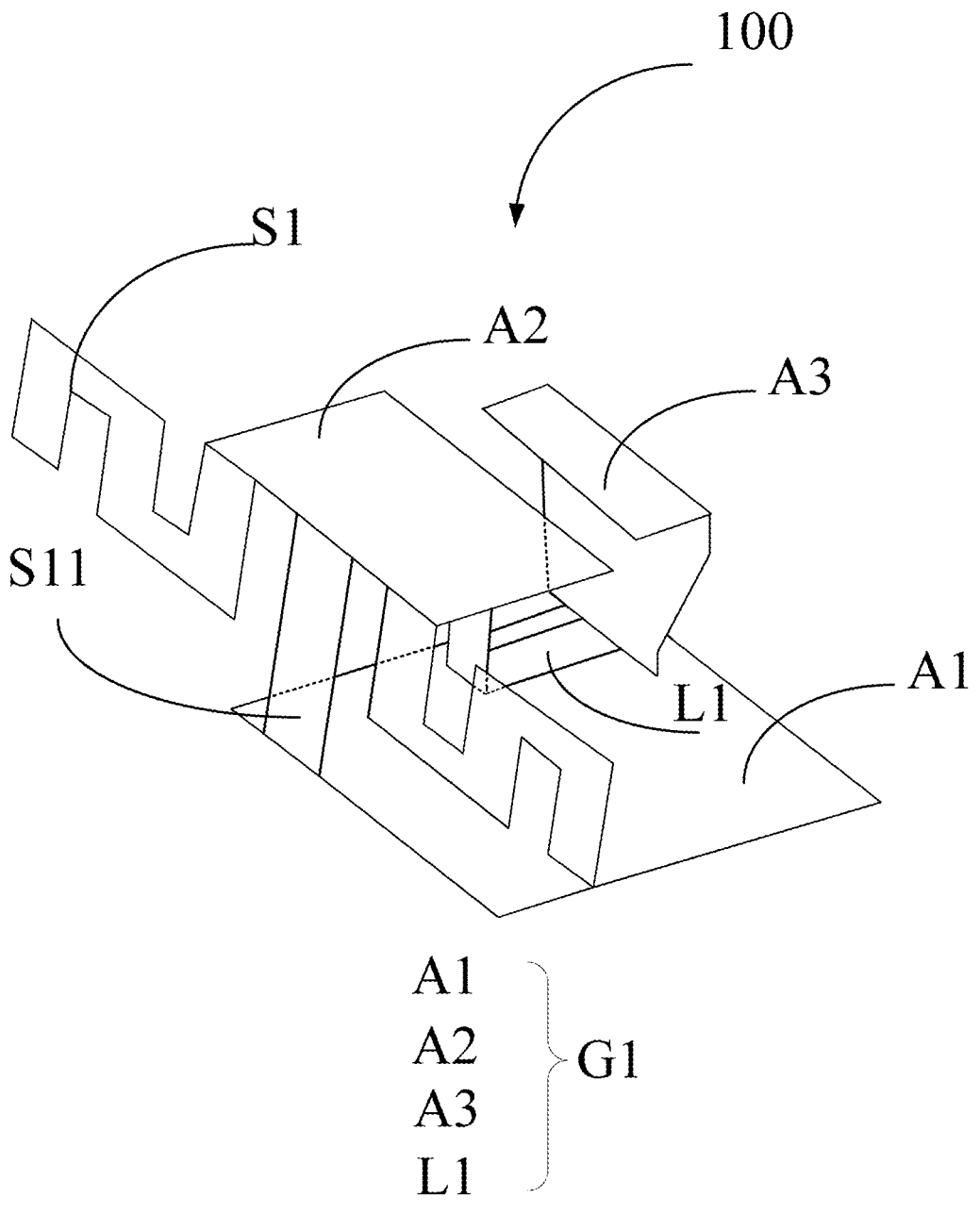
FIG. 2 is an optional structural schematic diagram of the first MIMO antenna of the antenna system of the present disclosure.

Specifically, combined with FIG. 2, FIG. 2 is an optional structural schematic diagram of the first MIMO antenna 100 of the antenna system 1 of the present disclosure. As shown in the FIG. 2, the grounding structure G1 of each first MIMO antenna 100 includes a first part A1, a second part A2, a third part A3, and a first connecting part L1. The first part A1 is in a rectangular shape and fixed to the base 2. The fence like structure S1 is vertically electrically connected to a first side of the first part A1 through a connecting strip S11. The second part A2 is in a rectangular shape and electrically connected to a top of the fence like structure S1. The second part A2 is parallel to the first part A1. The third part A3 is in a 7-shaped shape, one end of the third part A3 is electrically connected to an opposite side of a first side of the first part A1, and the other end of the third part A3 is suspended and facing one of the multiple second MIMO antenna (as described in detail below). The first connecting part L1, in an L-shape, is connected to the second part A2 and the third part A3.

The design of the first group of MIMO units 10 perpendicular to the base 2 and the fence like structure S1 makes the radiation field of the first group of MIMO unit 10 isotropic, thereby avoiding blind spots in reception.

The second group of MIMO antennas 20 includes multiple second MIMO antennas 200, and the multiple second MIMO antennas 200 are arranged at a middle area of the base 2. Each second MIMO antenna 200 is a planar structure, arranged on the substrate 201, and the substrate 201 is fixed to the base 2 and parallel to the base 2 through a support columns 202. In the embodiment, four second MIMO antennas 200a, 200b, 200c, and 200d are taken as examples, but not limited to this.

Figure 3:
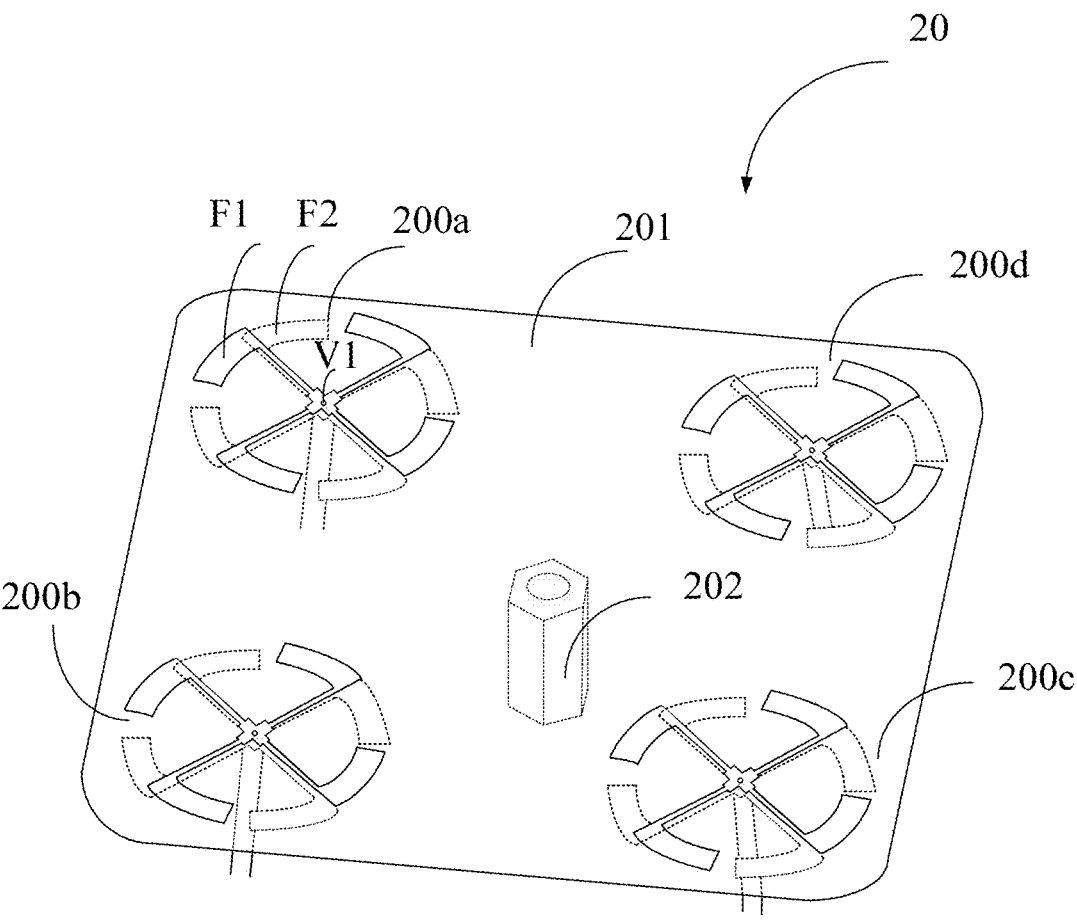
FIG. 3 is a schematic diagram of an optional structure of the second MIMO antennas of the antenna system of the present disclosure.

Combined with FIG. 3, FIG. 3 is a schematic diagram of an optional structure of the second MIMO antennas 200 of the antenna system 1 of the present disclosure. As shown in the FIG. 3, the second MIMO antennas 200a, 200b, 200c, and 200d have the same structure and are arranged at the four corners of the substrate 201 symmetrically. Each second MIMO antenna includes up windmill radiation patch F1 and down windmill radiation patch F2. In the embodiment, taking four up windmill radiation patches and four down windmill radiation patches as example, but not limited to this.

In the embodiment, the four up windmill radiation patch F1 are arranged on an upper surface of the substrate 201, and symmetrically distributed on a first circumference. The four down windmill radiation patches F2 are arranged on a lower surface of the substrate 201, and symmetrically distributed on a second circumference. Wherein a radius of the first circumference is same as a radius of the second circumference, and there is a through hole V1 between the first circumference and the second circumference. A positive wire of a transmission line (not shown in the figure) passes through the through hole V1 to connect to the up windmill radiation patch F1, and a negative wire of the transmission line is connected to the down windmill radiation patch F2. Wind blades of the up windmill radiation patch F1 and the down windmill radiation patch F2 are mirrored, and the blade connecting rod of the up windmill radiation patch F1 and the blade connecting rod of the down windmill radiation patch F2 coincide in the projection of the substrate 201. Specifically, each up windmill radiation patch F1 and each down windmill radiation patch F2 are in a 7-shaped shape, and an orientation of the four up windmill radiation patches F1 is different from an orientation of the four down windmill radiation patches F2. The second MIMO antennas adopt a mirror windmill radiation patch design with four equal directional structures, which makes the antenna radiation field of the second MIMO antennas isotropic and avoids blind spots in reception.

Combined with FIG. 1, the grounding structure G1 of each first MIMO antenna is oriented towards a corresponding second MIMO antenna. For example, the suspended end of the third part A3 of the grounding structure G1 of the first MIMO antenna 100a is oriented towards the second MIMO antenna 200a, and the suspended end of the third part A3 of the grounding structure G1 of the first MIMO antenna 100b is oriented towards the second MIMO antenna 200b. The same applies to the first MIMO antennas 100c and 100d. The first MIMO antenna adopts a fence like design and a grounding structure facing the second MIMO antenna, achieving high isolation between the first group of MIMO antennas 10 and the second group of MIMO antennas 20.

In the embodiment, the second group of MIMO antennas 20 adopt a planar structure parallel to the base 2 and are fixed to the base 2 by a support column 202 with a preset height, so that the second group of MIMO antennas 20 are higher than the preset height of the base 2. The first group of MIMO antennas 10 adopts a structure perpendicular to the base 2, thereby achieving ultra-high isolation between the first group of MIMO antennas 10 and the second group of MIMO antennas 20, with an isolation degree greater than 37 dB.

In the embodiment, the third group of MIMO antennas 30 comprises multiple third MIMO antennas 300, and the multiple third MIMO antennas 300 are arranged on four sides of the base 2. Each third MIMO antenna 300 is a wire structure perpendicular to the base 2. In the embodiment, taking four third MIMO antennas 300a, 300b, 300c, and 300d as an example, but not limited to this.

Figure 4:
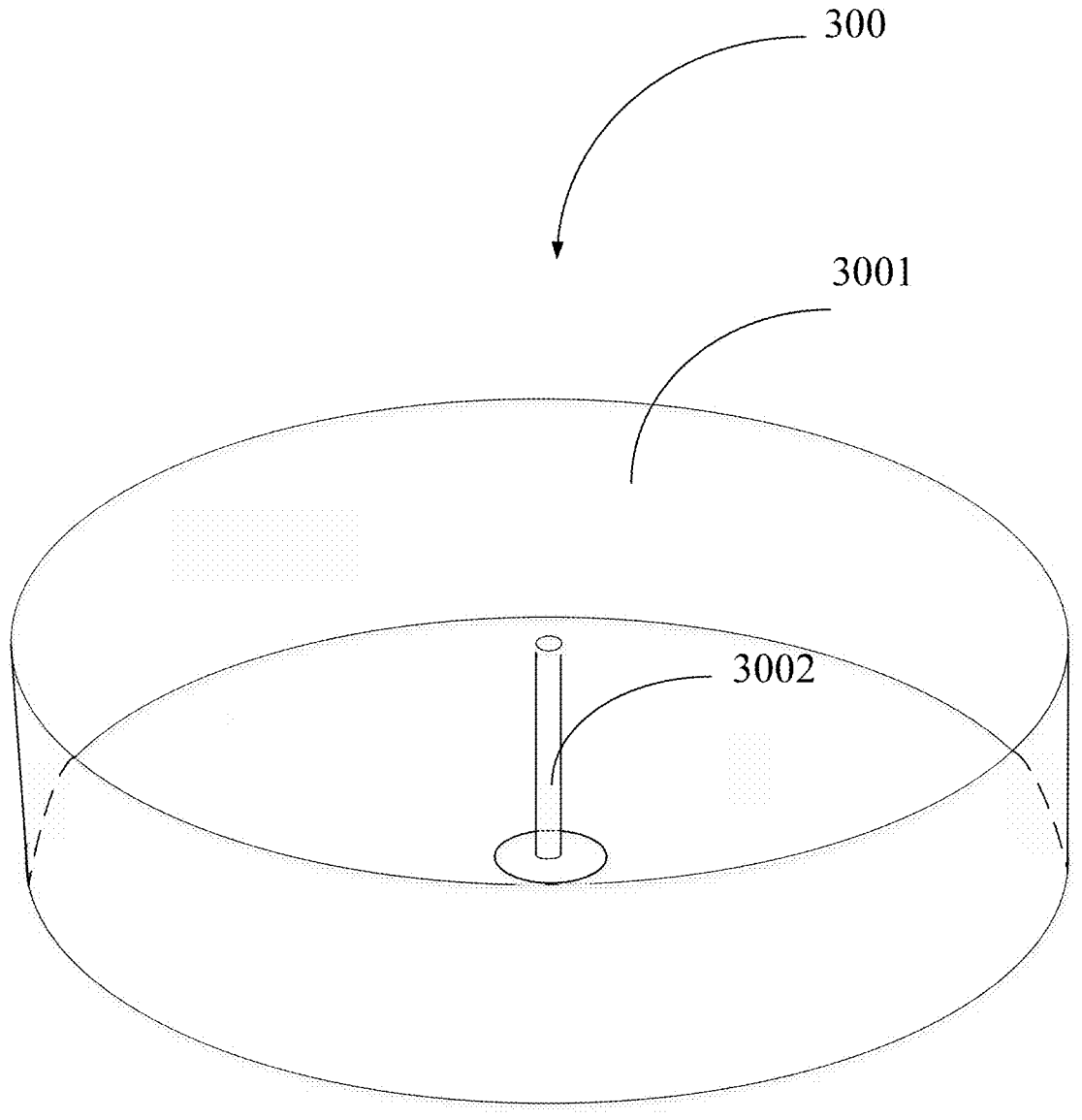
FIG. 4 is a schematic diagram of an optional structure of the third MIMO antenna of the antenna system of the present disclosure.

Combined with FIG. 4, FIG. 4 is a schematic diagram of an optional structure of the third MIMO antenna 300 of the antenna system 1 of the present disclosure. As shown in the figure, the third MIMO antenna 300a, 300b, 300c, and 300d have the same structure and are respectively arranged on the four sides of base 2. In the embodiment, each third MIMO antenna includes a dielectric structure 3001 and a wire structure 3002 perpendicular to the base 2, and the wire structure 3002 excites the dielectric structure 3001. The dielectric structure 3001 is in a hollow cylindrical shape, and a bottom of the dielectric structure 3001 is in a circular shape and arranged on the base 2. The four sides of the dielectric structure 3001 surround the bottom in a circular shape. The wire structure 3002 is vertically fixed at a center position of the bottom of the dielectric structure 3001. In a specific embodiment, the bottom center of the dielectric structure 3001 is provided a through hole, and a positive core wire of the wire structure 3002 directly penetrates into the through hole at the bottom center, that is, the positive core wire of the wire structure 3002 penetrates into the bottom center of the dielectric structure 3001 to form an antenna structure. The dielectric structure 3001 is made of dielectric materials, which can be plastic (Dk=3), FR4 (Dk=4.4), or higher dielectric materials such as ceramics (Dk=10) according to the dielectric constant (Dk) from low to high. The specific selection of suitable dielectric materials can be based on the actual application, and there is no limitation here. In the embodiment, the third MIMO antenna 300 excites the resonance of the dielectric structure 3001 through the wire structure 3002, so that the dielectric structure 3001 becomes a part of the radiating antenna.

In the embodiment, the second group of MIMO antennas 20 is parallel to the base 2 in a planar structure and is fixed to the base 2 by the support column 202 with the preset height, so that the second group of MIMO antennas 20 is higher than the preset height of base 2. The third group of MIMO antennas 30 adopts the antenna structure perpendicular to the base 2, so that the second group of MIMO antennas 20 and the third group of MIMO antennas 30 achieve ultra-high isolation degree, and the isolation degree is greater than 37 dB.

In the embodiment, the AUX antenna 40 is arranged on the side of the second group of MIMO antennas 20, and the AUX antenna is provided with a T-shaped slot parallel to the base 2. The AUX antenna 40 includes a first AUX antenna 400 and a second AUX antenna 401. The first AUX antenna 400 is arranged on a side of the second MIMO antenna 200a and the second MIMO antenna 200b, and the second AUX antenna 401 is arranged on a side of the second MIMO antenna 200c and the second MIMO antenna 200d.

Figure 5:
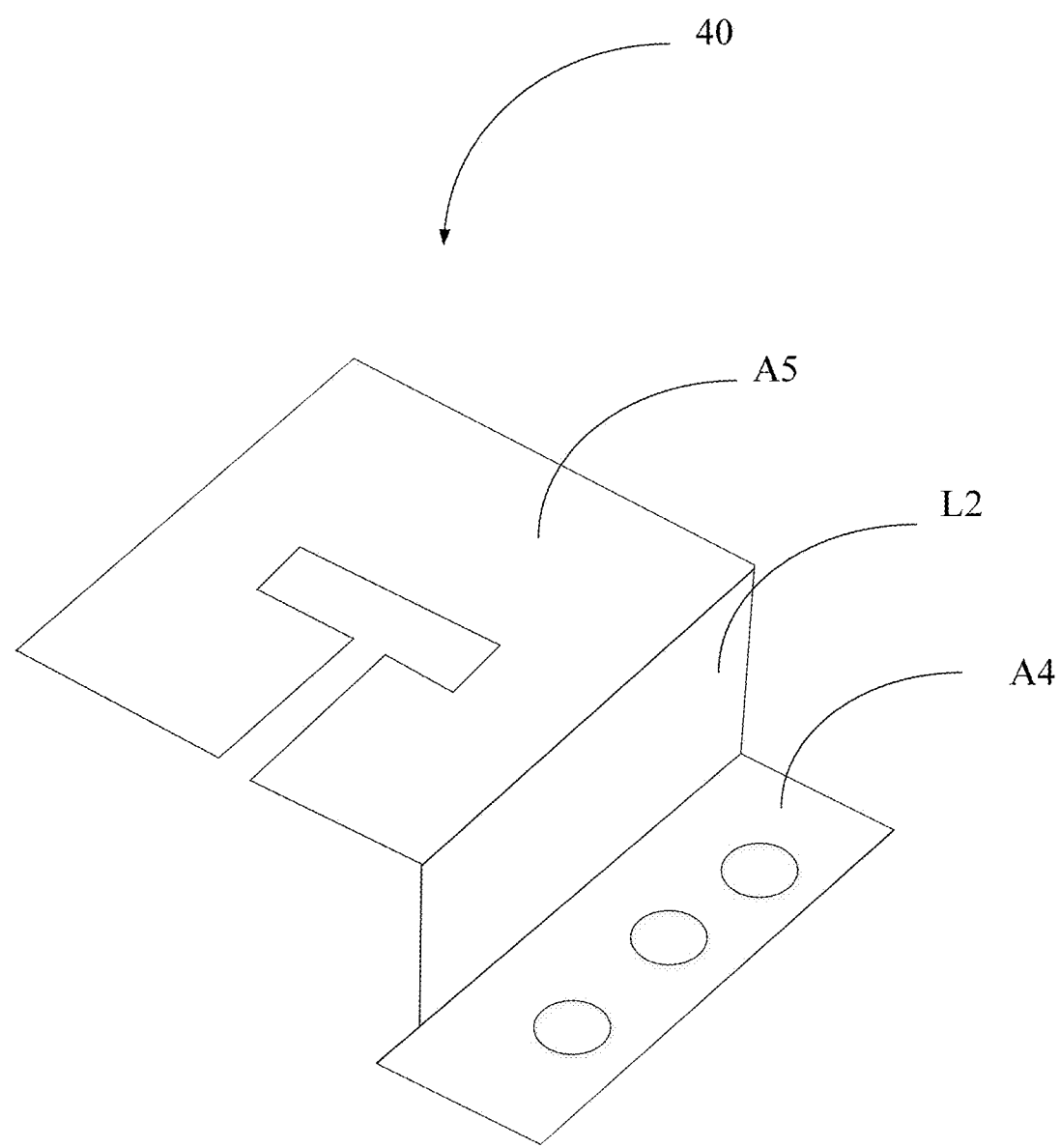
FIG. 5 is an optional structural schematic diagram of an AUX antenna of the antenna system of the present disclosure.

Combined with FIG. 5, FIG. 5 is an optional structural schematic diagram of the AUX antenna 40 of the antenna system 1 of the present disclosure. The structure of the first AUX antenna 400 and the second AUX antenna 401 are the same, both in a Z-shape, including a fourth part A4, a second connecting part L2, and a fifth part A5. The fourth part A4 is in a long strip shape and fixed to the base 2. In the embodiment, the fourth part A4 may include multiple through holes, and the fourth part A4 are fixed to the base 2 by fixing screws through the through holes. In other embodiments, the fourth part A4 can be a whole metal sheet, and is fixed on the base 2 by pressing. One end of the second connecting part L2 is vertically electrically connected to the fourth part A4. The fifth part A5 is in a long strip shape and provided with a T-shaped slot, and the fifth part A5 is electrically connected to the other end of the second connecting part L2.

Figure 6:
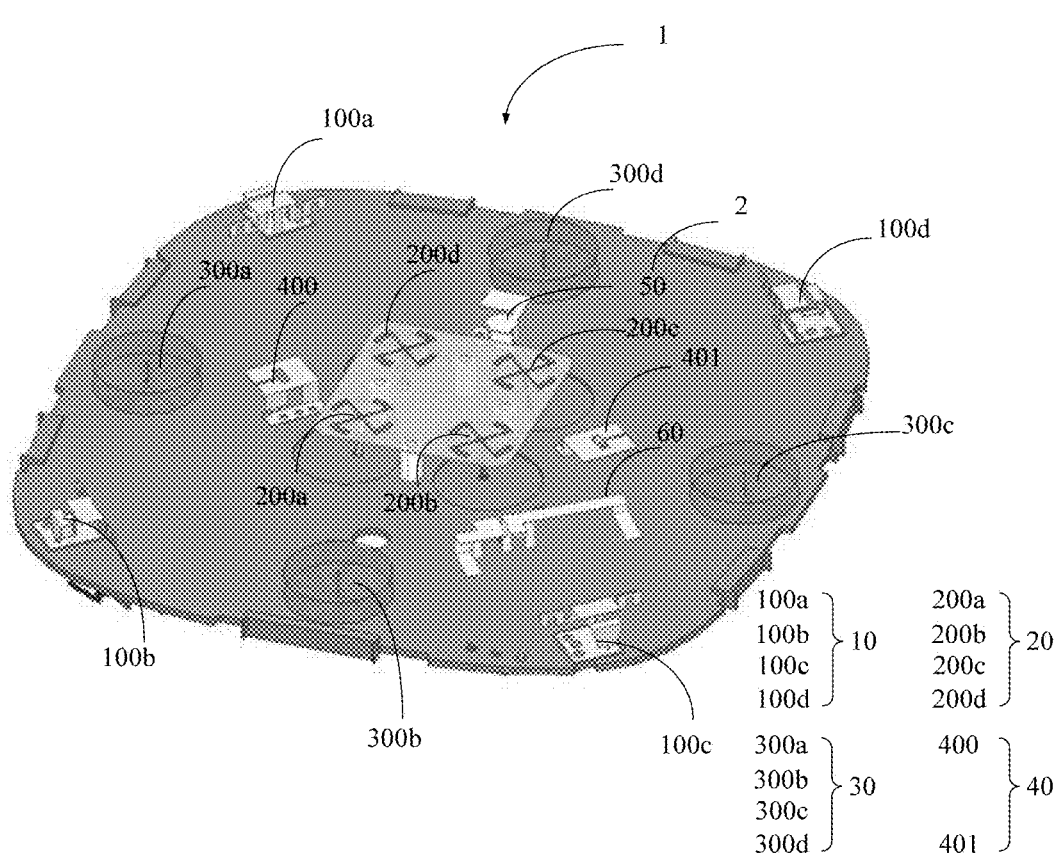
FIG. 6 is an optional structural schematic diagram of the antenna system of the present disclosure.

Referring to FIG. 6, FIG. 6 is an optional structural schematic diagram of the antenna system 1 of the present disclosure. The antenna System 1 is mainly used for wireless switch electronic devices, such as AP (Access Point). In the embodiment, the antenna system 1 is installed on the base 2, including a first group of MIMO antennas 10, a second group of MIMO antennas 20, a third group of MIMO antennas 30, an AUX antenna 40, an IoT antenna 50, and a GPS antenna 60. The structure and principle of the first group of MIMO antennas 10, the second group of MIMO antennas 20, the third group of MIMO antennas 30, and the AUX antenna 40 are similar to the above embodiments, and will not be repeated here.

In the embodiment, the IoT antenna 50 is arranged on the other side of the second group of MIMO antennas 20, with an L-shaped structure parallel to the base 2. As shown in FIG. 6, the IoT antenna 50 is arranged on a side of the second MIMO antenna 200a and the second MIMO antenna 200d.

Figure 7:
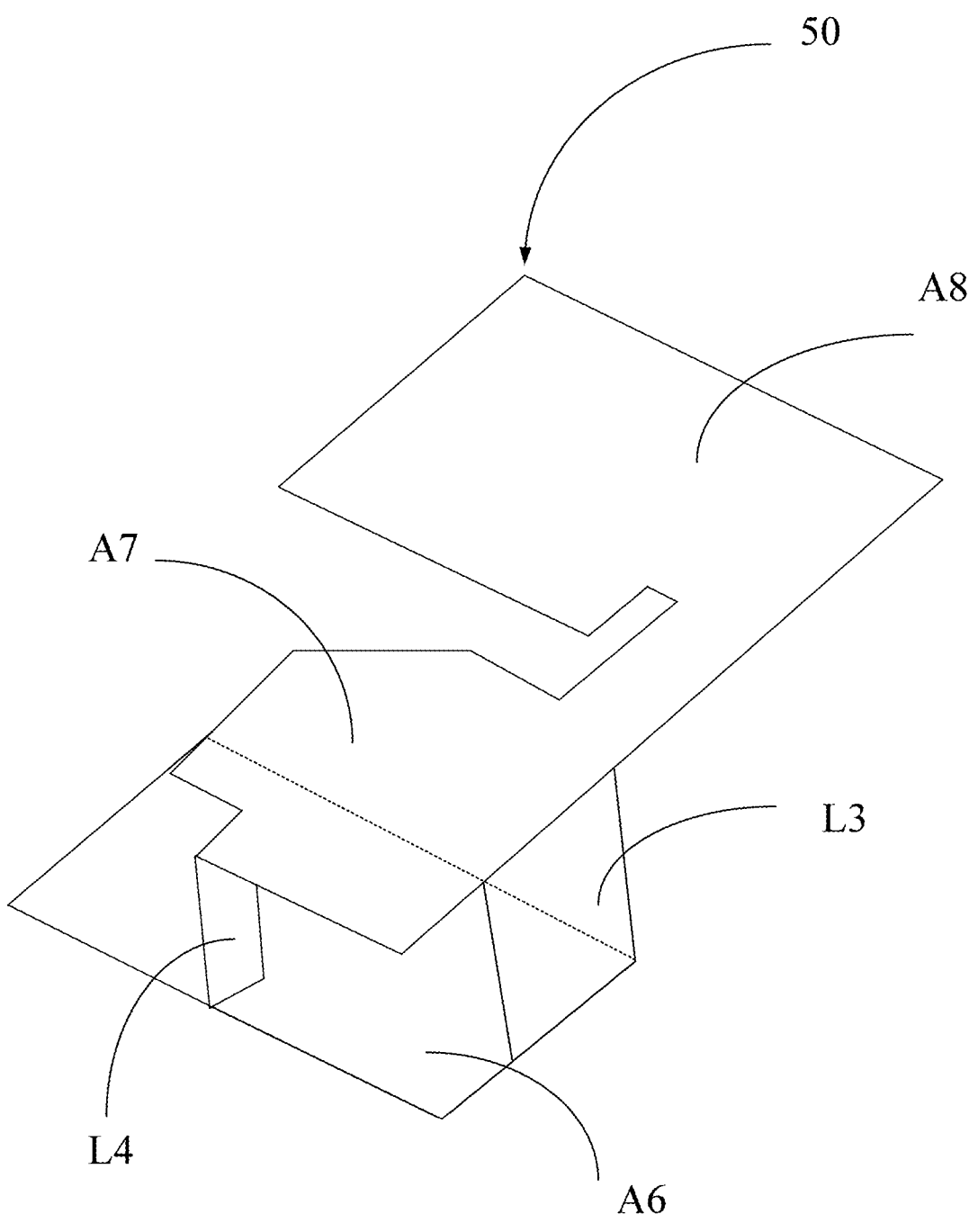
FIG. 7 is a schematic diagram of an optional structure of an IoT antenna in the antenna system of the present disclosure.

Combined with FIG. 7, FIG. 7 is a schematic diagram of an optional structure of the IoT antenna 50 in the antenna system 1 of the present disclosure. As shown in the FIG. 7, the IoT antenna 50 includes a sixth part A6, a seventh part A7, and an eighth part A8. The sixth part A6 is in a long strip shape and fixed to the base 2. The seventh part A7 is in a block shape and parallel to the sixth part A6, and the seventh part A7 is supported and fixed by the third connecting part L3 and the fourth connecting part L4. The eighth part A8 is in II-shaped shape. One end of the eighth part A8 is electrically connected to one side of the seventh part A7, and the other end of the eighth part A8 is suspended.

Figure 8:
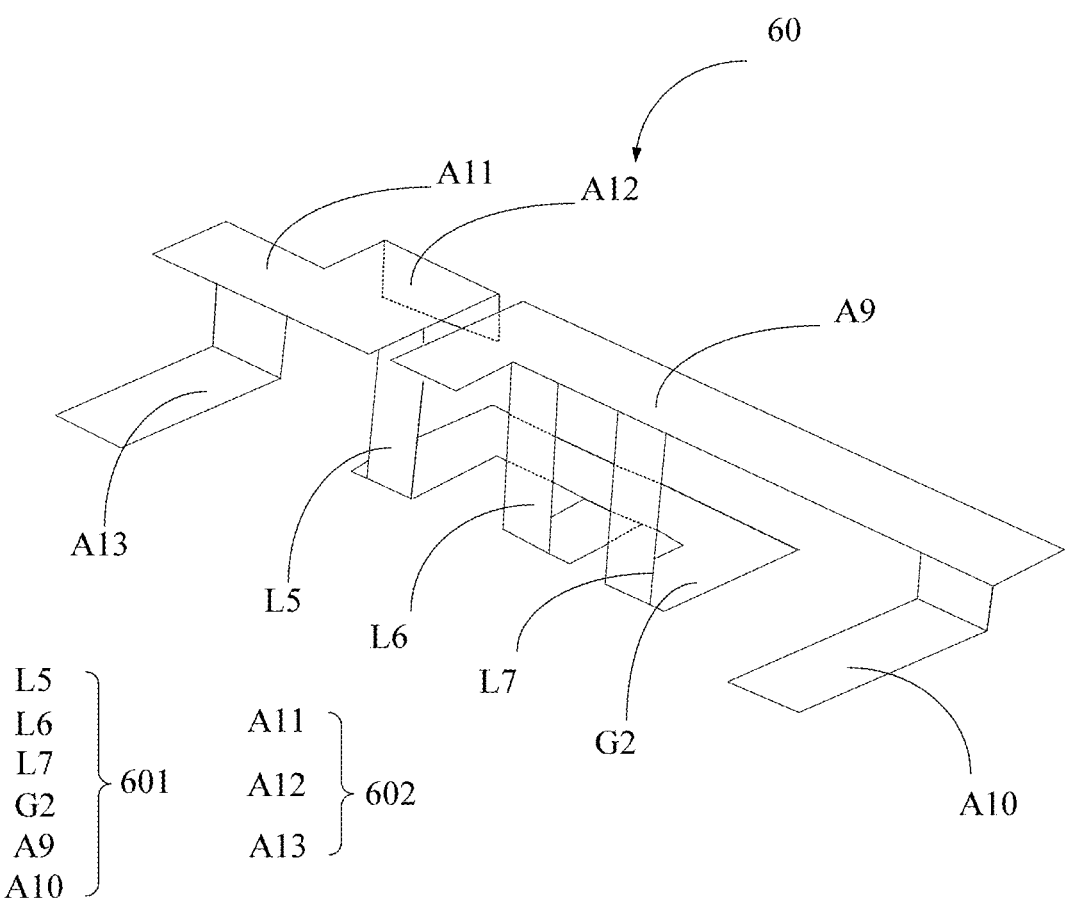
FIG. 8 is a schematic diagram of an optional structure of a GPS antenna in the antenna system of the present disclosure.

In the embodiment, the GPS antenna 60 is arranged between two of the third MIMO antennas. As shown in FIG. 8, the GPS antenna 60 is arranged between the third MIMO antenna 300b and the third MIMO antenna 300c.

Combined with FIG. 8, FIG. 8 is a schematic diagram of an optional structure of the GPS antenna 60 in the antenna system 1 of the present disclosure. As shown in the FIG. 8, the GPS antenna 60 includes a coupling grounding portion 601 and a feeding part 602.

The coupling grounding part 601 includes a grounding part G2, a fifth connecting part L5, a sixth connecting part L6, a seventh connecting part L7, a ninth part A9, and a tenth part A10. The grounding part G2 is in an E shape and fixed on the base 2. The fifth connecting part L5, the sixth connecting part L6, and the seventh connecting part L7 are respectively connected to the grounding part G2 at one end, as shown in the FIG. 8. The fifth connecting part L5, the sixth connecting part L6, and the seventh connecting part L7 are vertically electrically connected to three ports of the grounding part G2. The ninth part A9 is in an L-shape and parallel to the base 2. The ninth part A9 is electrically connected to the other end of the sixth connecting part A6 and the seventh connecting part A7. The tenth part A10 is in an L-shape. One end of the tenth part A10 is electrically connected to the end of the ninth part A9 and the other end of the tenth part A10 is suspended.

The feeding part 602 includes an eleventh section A11, a twelfth section A12, and a thirteenth section A13. The eleventh part A11 is in an L-shape and electrically connected to the other end of the fifth connecting part L5. The eleventh part A11 is parallel to the base 2. The twelfth part A12 is in a long strip shape and connected to one side of the eleventh part A11. The thirteenth part A13 is in an L-shape. One end of the thirteenth part A13 is electrically connected to the other side of the eleventh part A11 and the other end of the thirteenth part A13 is suspended. The tenth part A10 and the thirteenth part A13 are symmetrical to each other.

In the embodiment, the symmetrical design of the tenth part A10 and the thirteenth part A13 of the GPS antenna 60 makes the antenna radiation field of GPS antenna 60 isotropic, thereby avoiding blind spots in reception.

Figure 9A:
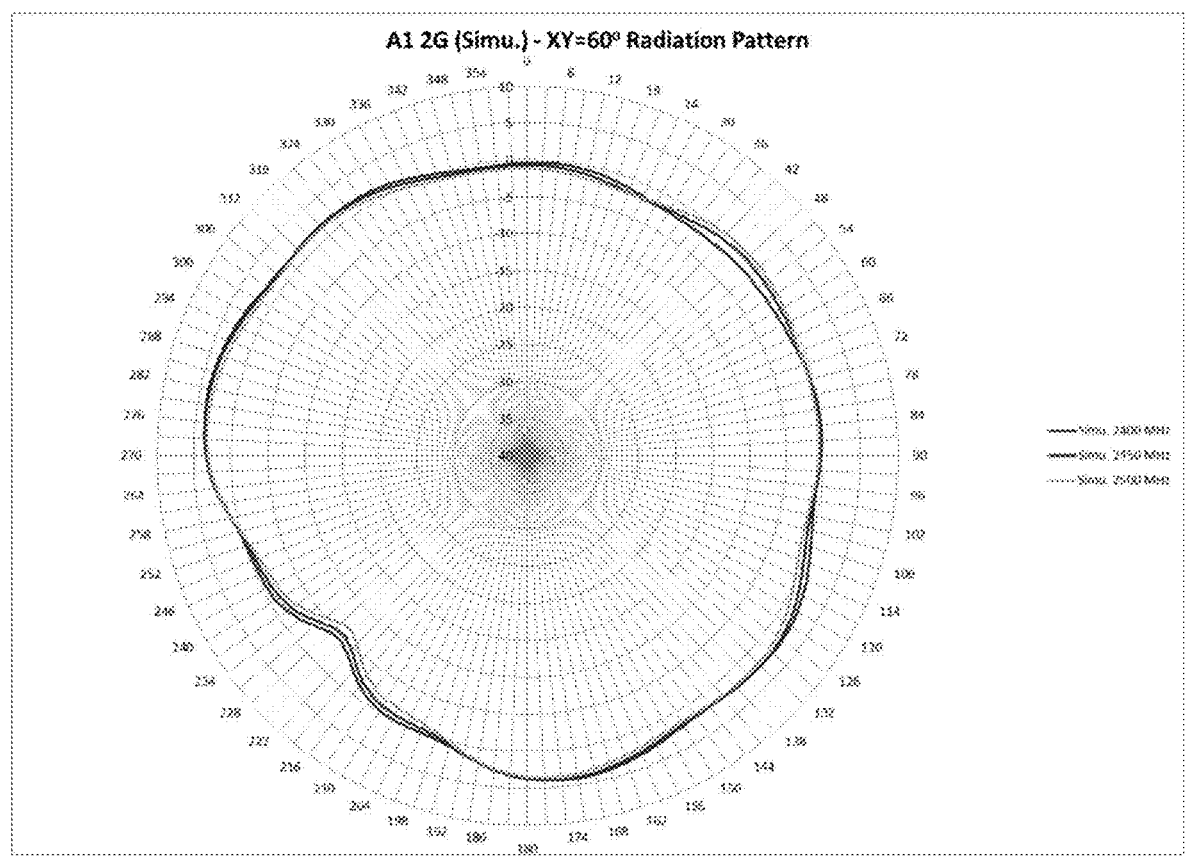
FIG. 9A is a simulation diagram of a gain of the first MIMO antenna in a 2G frequency band of the antenna system of the present disclosure.
Figure 9B:
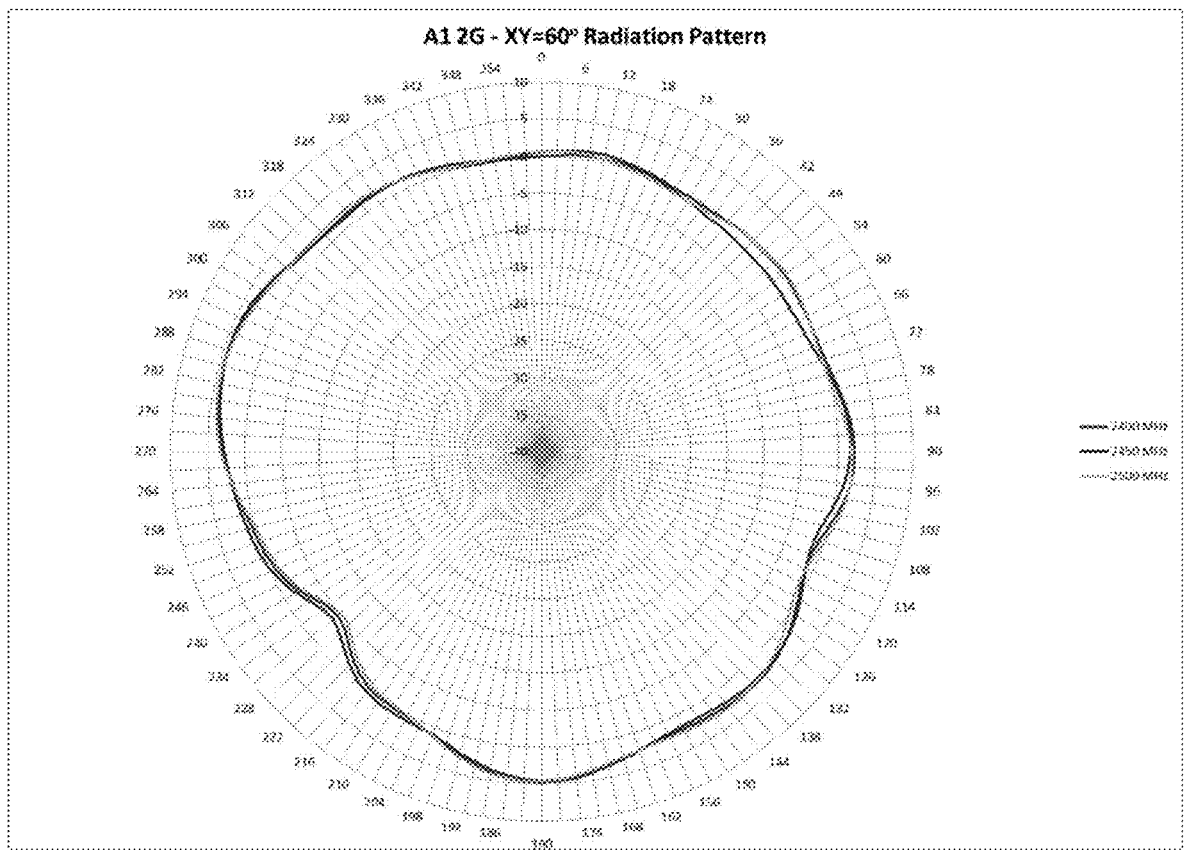
FIG. 9B is an actual measurement diagram of a gain of the first MIMO antenna in the 2G frequency band of the antenna system of the present disclosure.

Referring to FIGS. 9A-9B, FIGS. 9A-9B are respectively a simulation diagram and an actual measurement diagram of a gain of the first MIMO antenna in the 2G frequency band of the antenna system 1 of the present disclosure.

In the embodiment, taking the first MIMO antenna 100a as an example.

TABLE 1

| Simulated gain values of the first MIMO antenna 100a in the 2G frequency band | | | |
|---|---|---|---|
| | 2400 Hz | 2450 Hz | 2500 Hz |
| Max gain value | 4.1 dB | 4.0 dB | 3.6 dB |
| Min gain value | −4.5 dB | −5.3 dB | −6.4 dB |
| Gain ripple | 8.6 dB | 9.3 dB | 10.0 dB |

TABLE 2

| Actual measured gain values of the first MIMO antenna 100a in the 2G frequency band | | | |
|---|---|---|---|
| | 2400 Hz | 2450 Hz | 2500 Hz |
| Max gain value | 4.5 dB | 4.8 dB | 4.7 dB |
| Min gain value | −3.8 dB | −4.7 dB | −5.3 dB |
| Gain ripple | 8.3 dB | 9.5 dB | 9.9 dB |

According to FIGS. 9A-9B, Table 1, and Table 2, it can be seen that the gain ripple of the first MIMO antenna 100*a* in the 2G frequency band is within 10 dB.

Figure 10A:
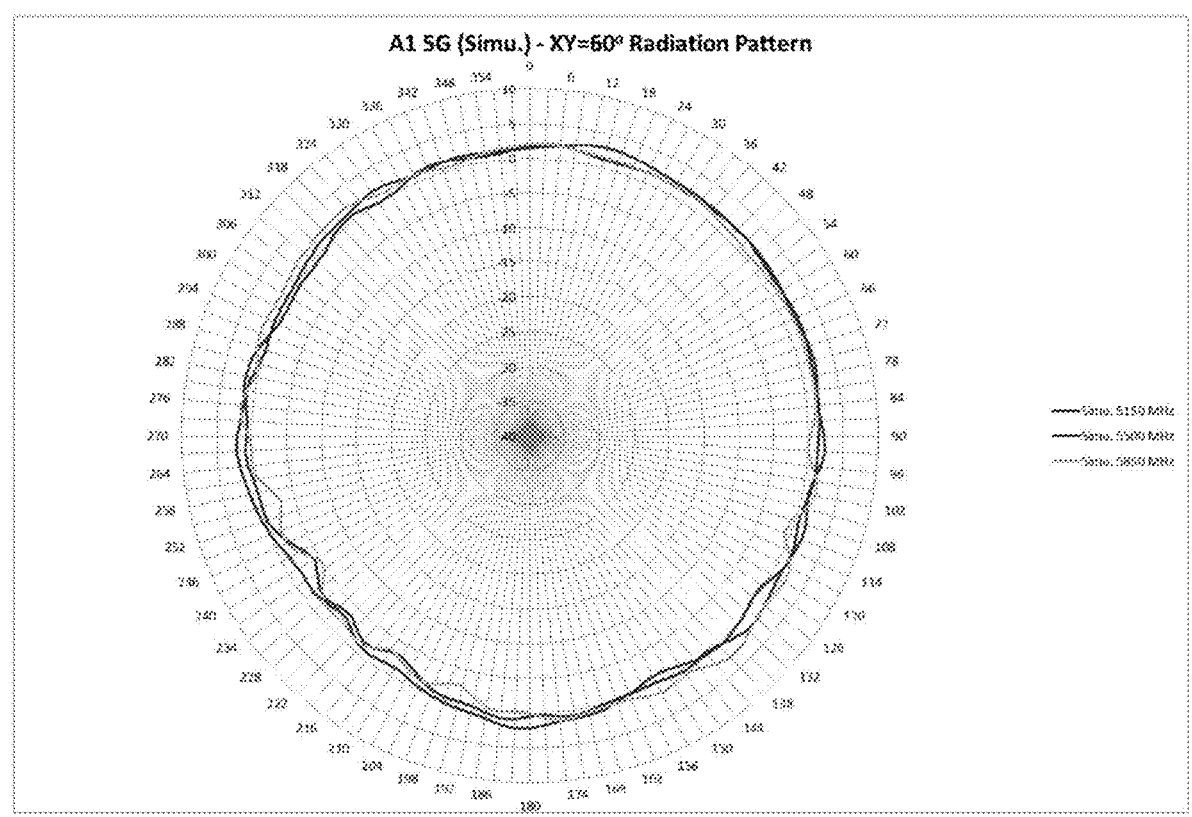
FIG. 10A is a simulation diagram of the gain of the first MIMO antenna in a 5G frequency band of the antenna system of the present disclosure.
Figure 10B:
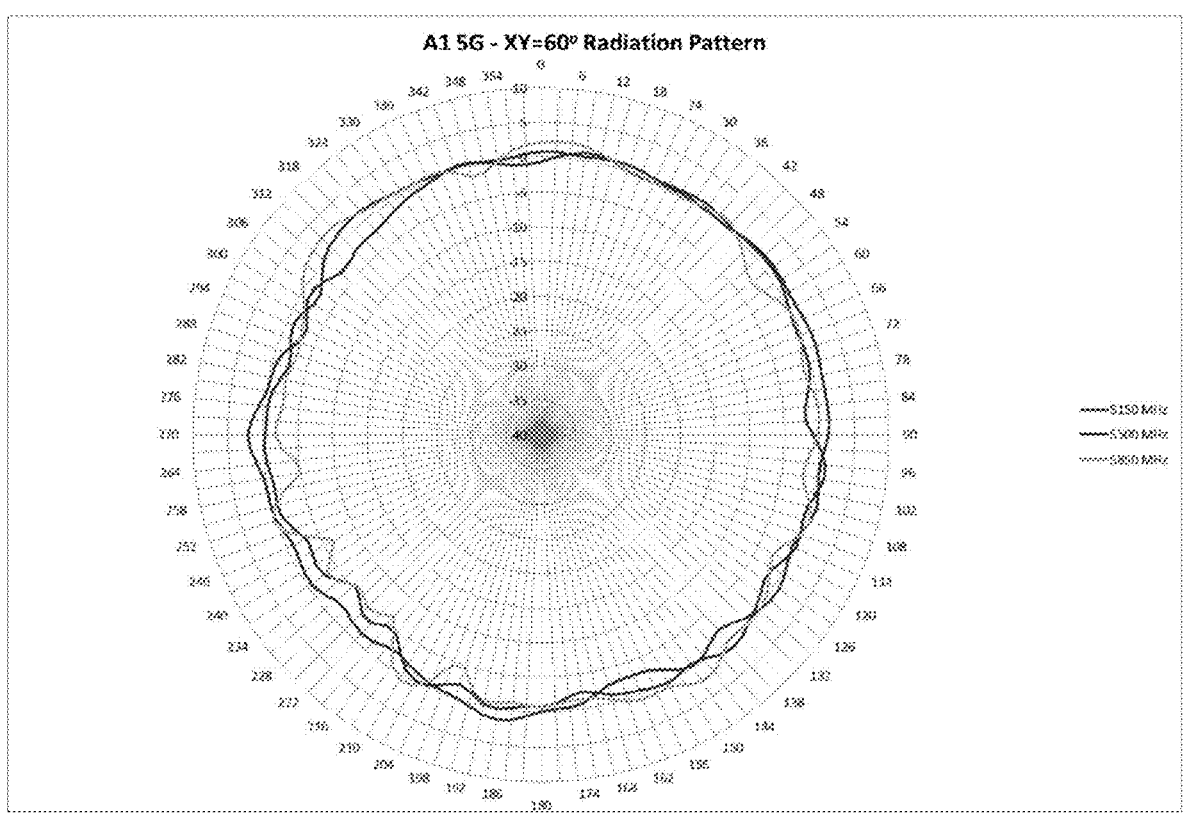
FIG. 10B is an actual measurement diagram of the gain of the first MIMO antenna in the 5G frequency band of the antenna system of the present disclosure.

Referring to FIGS. 10A-10B, FIGS. 10A-10B are respectively a simulation diagram and an actual measurement diagram of the gain of the first MIMO antenna in the 5G frequency band of the antenna system 1 of the present disclosure.

In the embodiment, also taking the first MIMO antenna 100*a* as an example.

TABLE 3

| Simulated gain values of the first MIMO antenna 100a in the 5G frequency band | | | |
|---|---|---|---|
| | 5150 Hz | 5500 Hz | 5850 Hz |
| Max gain value | 2.2 dB | 3.0 dB | 3.0 dB |
| Min gain value | −2.7 dB | −4.3 dB | −4.9 dB |
| Gain ripple | 4.9 dB | 7.3 dB | 7.9 dB |

TABLE 4

| Actual measured gain values of the first MIMO antenna 100a in the 5G frequency band | | | |
|---|---|---|---|
| | 5150 Hz | 5500 Hz | 5850 Hz |
| Max gain value | 2.1 dB | 1.4 dB | 2.5 dB |
| Min gain value | −3.1 dB | −5.6 dB | −6.7 dB |
| Gain ripple | 5.2 dB | 7.0 dB | 9.2 dB |

According to FIGS. 10A-10B, Table 3, and Table 4, it can be seen that the gain ripple of the first MIMO antenna 100*a* in the 5G frequency band is within 10 dB, which meets the radiation isotropy of the antenna.

Figure 11A:
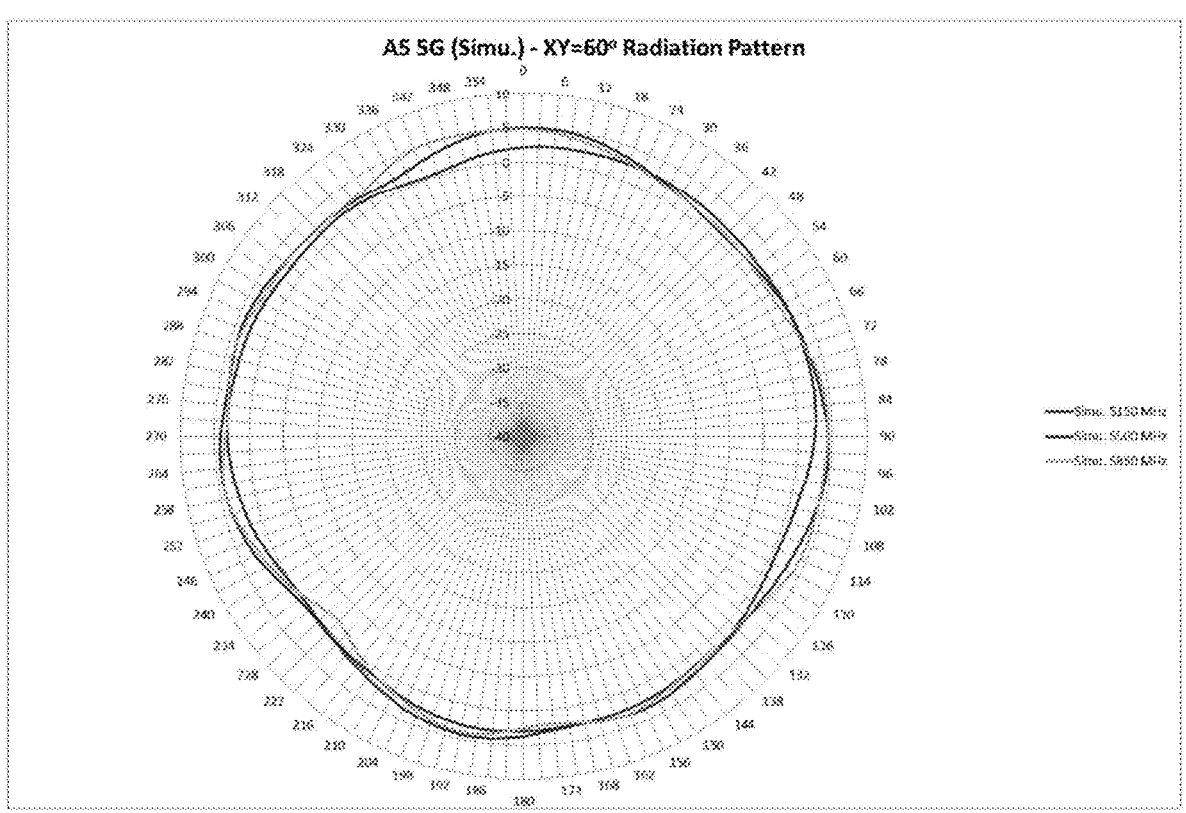
FIG. 11A is a simulation diagram of the gain of the second MIMO antenna in the 5G frequency band of the antenna system of the present disclosure.
Figure 11B:
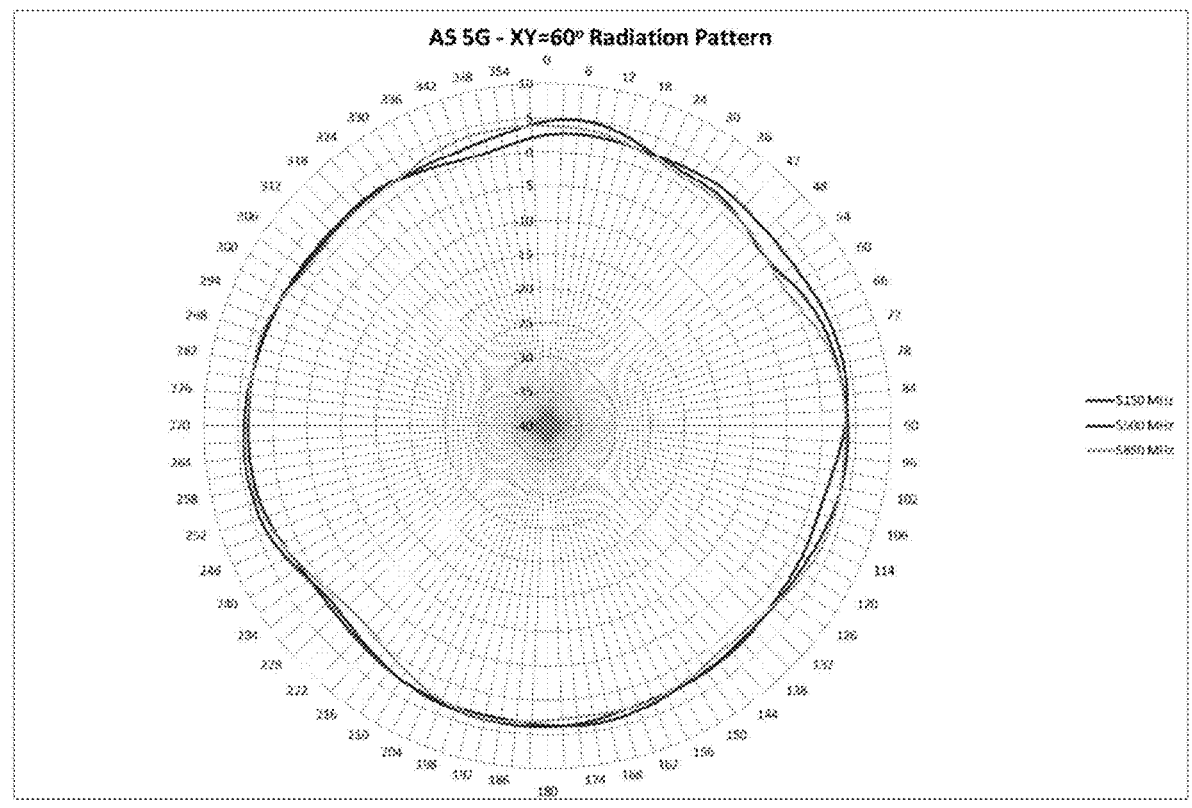
FIG. 11B is an actual measurement diagram of the gain of the second MIMO antenna in the 5G frequency band of the antenna system of the present disclosure.

Referring to FIGS. 11A-11B, FIGS. 11A-11B are respectively a simulation diagram and an actual measurement diagram of the gain of the second MIMO antenna in the 5G frequency band of the antenna system 1 of the present disclosure.

In the embodiment, taking the second MIMO antenna 200*a* as an example.

TABLE 5

| Simulation gain values of the second MIMO antenna 200a in the 5G frequency band | | | |
|---|---|---|---|
| | 5150 Hz | 5500 Hz | 5850 Hz |
| Max gain value | 3.2 dB | 5.0 dB | 5.0 dB |
| Min gain value | −0.1 dB | 0.3 dB | −1.9 dB |
| Gain ripple | 3.3 dB | 4.7 dB | 6.9 dB |

TABLE 6

| Actual measured gain values of the first MIMO antenna 200a in the 5G frequency band | | | |
|---|---|---|---|
| | 5150 Hz | 5500 Hz | 5850 Hz |
| Max gain value | 4.1 dB | 4.9 dB | 4.1 dB |
| Min gain value | 0.7 dB | 0.2 dB | −0.8 dB |
| Gain ripple | 3.4 dB | 4.8 dB | 5.0 dB |

According to FIGS. 11A-11B, Table 5, and Table 6, it can be seen that the gain ripple of the second MIMO antenna 200*a* in the 5G frequency band is within 10 dB, which meets the radiation isotropy of the antenna.

Figure 12A:
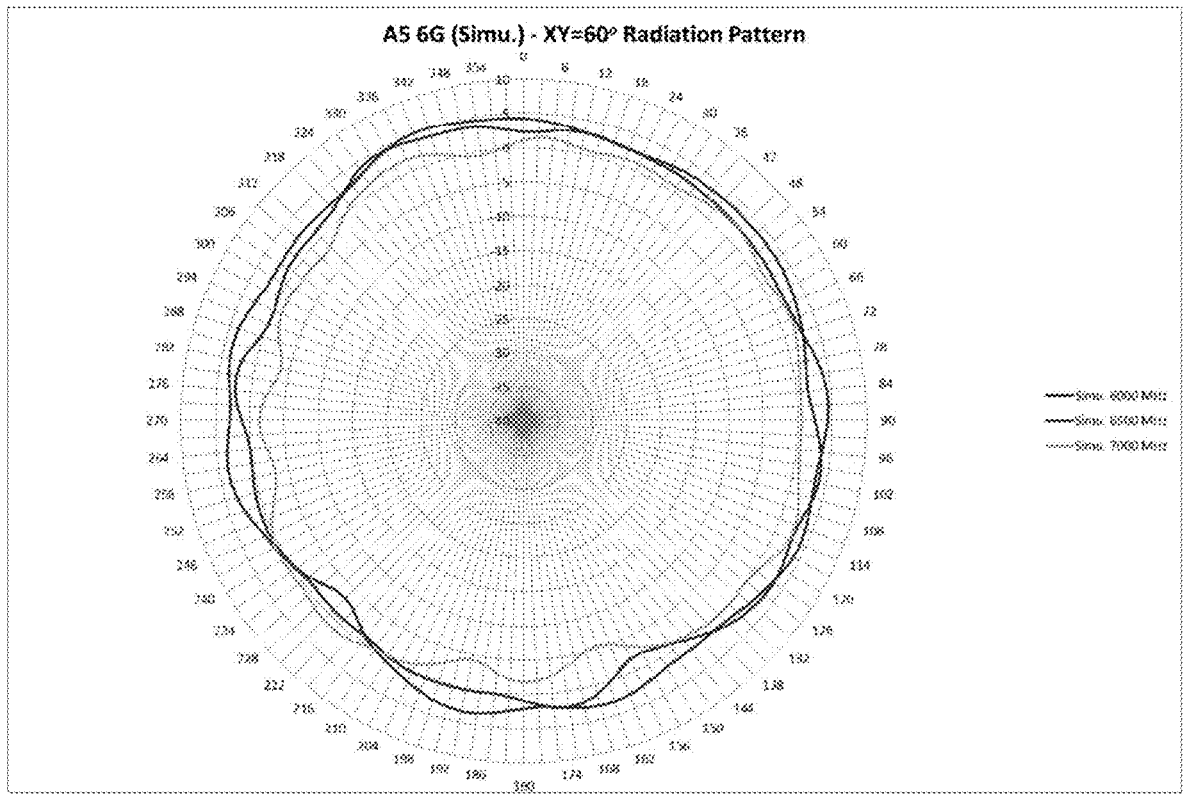
FIG. 12A is a simulation diagram of the gain of the second MIMO antenna in a 6G frequency band of the antenna system of the present disclosure.
Figure 12B:
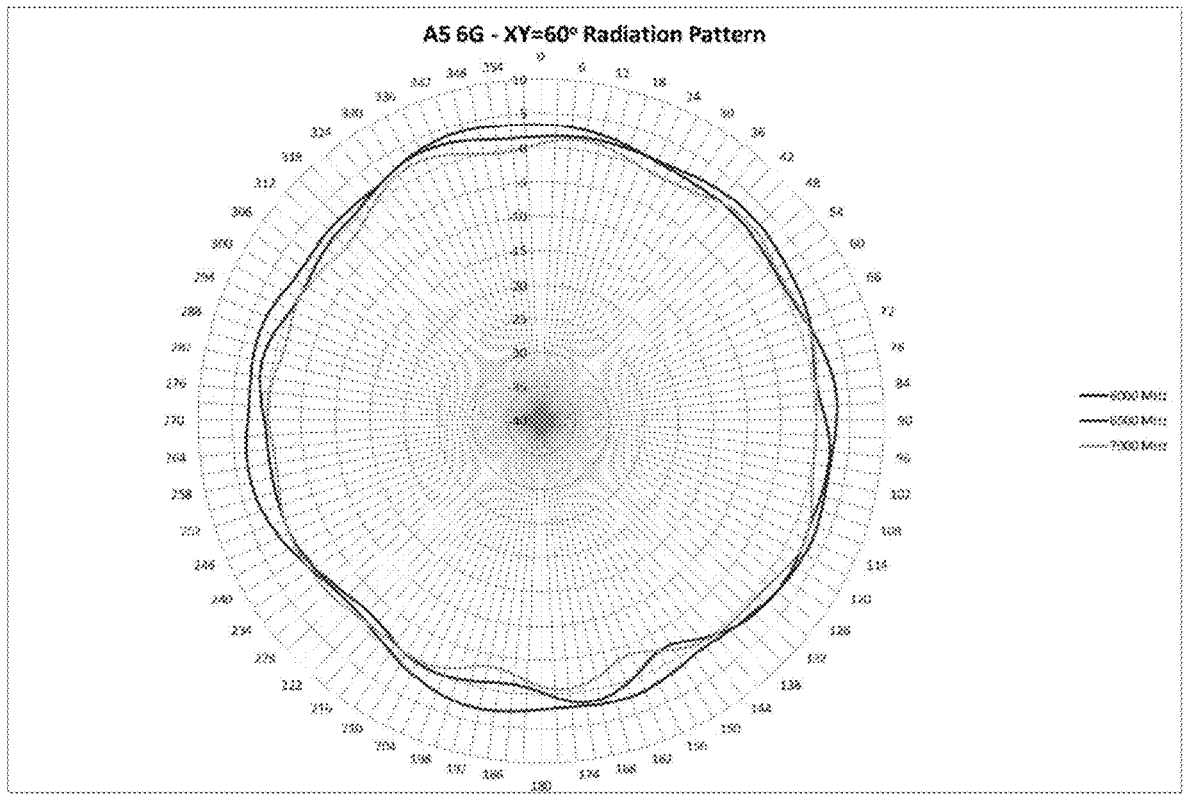
FIG. 12B is an actual measurement diagram of the gain of the second MIMO antenna in the 6G frequency band of the antenna system of the present disclosure.

Referring to FIGS. 12A-12B, FIGS. 12A-12B are respectively a simulation diagram and an actual measurement diagram of the gain of the second MIMO antenna in the 6G frequency band of the antenna system 1 of the present disclosure.

In the embodiment, taking the second MIMO antenna 200*a* as an example.

TABLE 7

| Simulation gain values of the second MIMO antenna 200a in the 6G frequency band | | | |
|---|---|---|---|
| | 6000 Hz | 6500 Hz | 7000 Hz |
| Max gain value | 5.1 dB | 4.5 dB | 2.5 dB |
| Min gain value | −3.4 dB | −2.0 dB | −5.5 dB |
| Gain ripple | 8.5 dB | 6.5 dB | 8.0 dB |

TABLE 8

| Actual measured gain values of the first MIMO antenna 200a in the 6G frequency band | | | |
|---|---|---|---|
| | 6000 Hz | 6500 Hz | 7000 Hz |
| Max gain value | 3.9 dB | 3.1 dB | 2.3 dB |
| Min gain value | −1.4 dB | −2.5 dB | −3.5 dB |
| Gain ripple | 5.3 dB | 5.6 dB | 5.8 dB |

According to FIGS. 12A-12B, Table 7, and Table 8, it can be seen that the gain ripple of the second MIMO antenna 200*a* in the 6G frequency band is within 10 dB, which meets the radiation isotropy of the antenna.

Figure 13A:
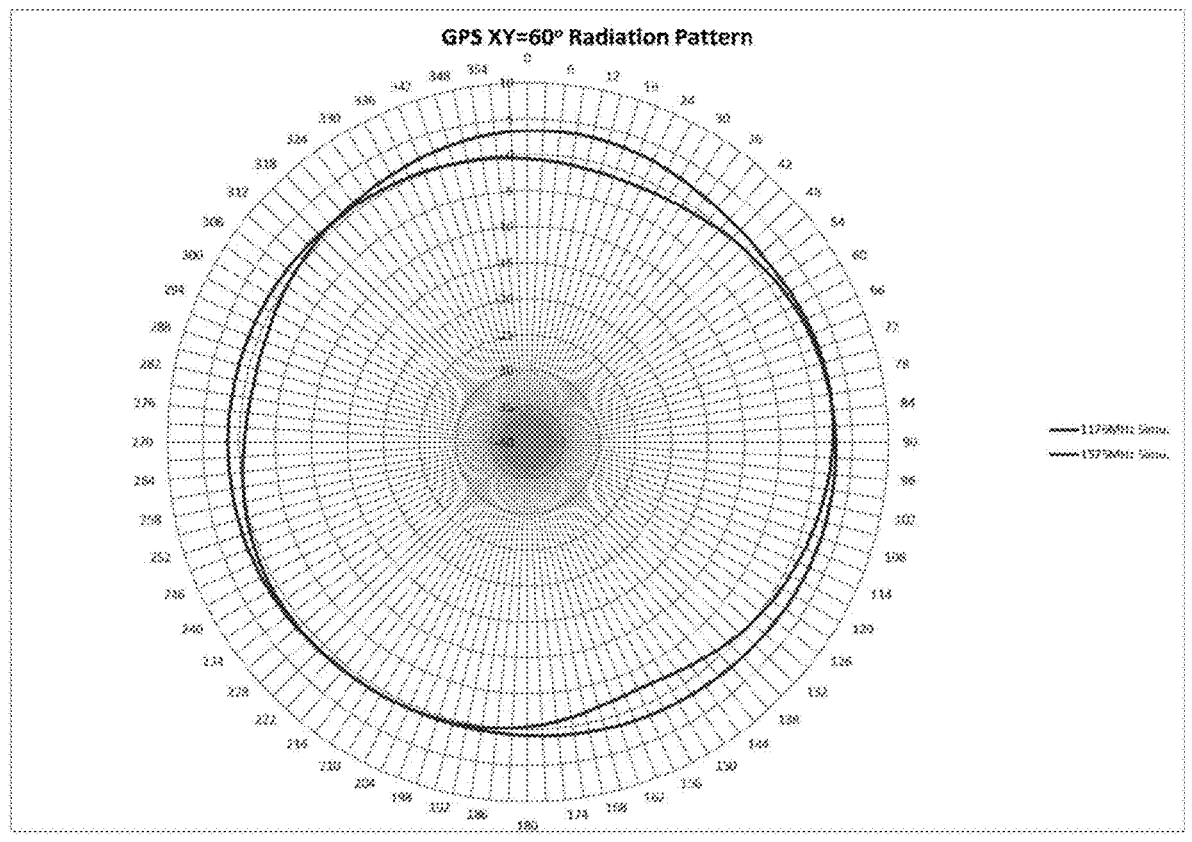
FIG. 13A is a simulation diagram of the gain of the GPS antenna in a horizontal radiation plane of the antenna system of the present disclosure.
Figure 13B:
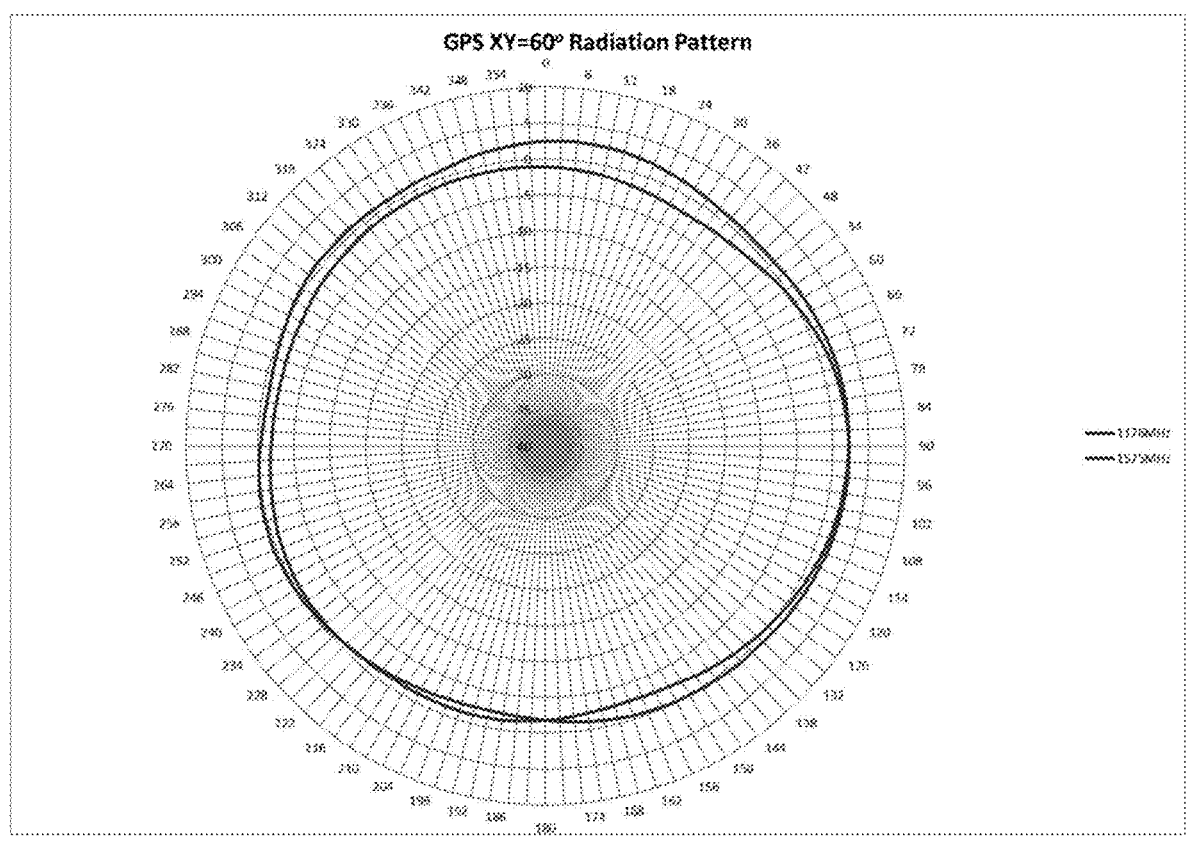
FIG. 13B is an actual measurement diagram of the gain of the GPS antenna in a horizontal radiation plane of the antenna system of the present disclosure.

Referring to FIGS. 13A-13B, FIGS. 13A-13B are respectively a simulation diagram and an actual measurement diagram of the gain of the GPS antenna in a horizontal radiation plane of the antenna system 1 of the present disclosure.

TABLE 9

| Simulated gain values of GPS antenna 60 on the horizontal radiation surface | | |
|---|---|---|
| | 1.176 GHz | 1.575 GHz |
| Max gain value | 2.9 dB | 3.4 dB |
| Min gain value | −1.3 dB | −2.3 dB |
| Gain ripple | 4.1 dB | 5.7 dB |

TABLE 10

| Actual measured gain values of GPS antenna 60 on the horizontal radiation surface | | |
|---|---|---|
| | 1.176 GHz | 1.575 GHz |
| Max gain value | 2.3 dB | 2.6 dB |
| Min gain value | −2.4 dB | −2.6 dB |
| Gain ripple | 4.7 dB | 5.2 dB |

According to FIGS. 13A-13B, Table 9, and Table 10, it can be seen that the gain ripple of GPS antenna 60 on the horizontal radiation surface is within 10 dB, which meets the radiation isotropy of the antenna.

Compared to the prior art, in the antenna system provided by the embodiments of the present disclosure, the second group of MIMO antennas adopts a planar structure parallel to the base, and is fixed to the base by a support column with a preset height, so that the second group of MIMO antennas are higher than the base; and the first group of MIMO antennas adopts a structure perpendicular to the base, which achieves ultra-high isolation between the first group of MIMO antennas and the second group of MIMO antennas. At the same time, the design of the first group of MIMO units perpendicular to the base and the fence like structure makes the radiation field of the first group of MIMO unit isotropic, thereby avoiding blind spots in reception; the third group of MIMO antennas adopts an antenna structure perpendicular to the base, thereby achieving ultra-high isolation between the second group of MIMO antennas and the third group of MIMO antennas, solving the problems of low isolation and uneven signal coverage in high throughput antenna systems in prior art, as well as the existence of dead corners in reception.

Many details are often found in the relevant art and many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An antenna system, installed on a base, comprising:
a first group of MIMO antennas comprising multiple first MIMO antennas, wherein the multiple first MIMO antennas are respectively arranged at four corners of the base, and each first MIMO antenna is provide with a grounding structure and a fence like structure perpendicular to the base;
a second group of MIMO antennas comprising multiple second MIMO antennas, wherein the multiple second MIMO antennas are arranged at a middle area of the base, each second MIMO antenna is a planar structure, arranged on a substrate, and the substrate is fixed to the base through a support column and the substrate is parallel to the base;
a third group of MIMO antennas comprising multiple third MIMO antennas, wherein the multiple third MIMO antennas are respectively arranged on four sides of the base, and each third MIMO antenna comprises a dielectric structure and a wire structure perpendicular to the base, and the wire structure excites the dielectric structure; and
an AUX antenna, arranged on a side of the second group of MIMO antennas, and the AUX antenna is provided with a T-shaped slot parallel to the base, wherein
the grounding structure of each first MIMO antenna comprises:
a first part, in a rectangular shape, and fixed to the base, wherein the fence like structure is vertically electrically connected to a first side of the first part through a connecting strip;
a second part, in a rectangular shape, and electrically connected to the top of the fence like structure;
a third part, in a 7-shaped shape, wherein one end of the third part is electrically connected to an opposite side of the first side, and the other end of the third part is suspended and facing one of the multiple second MIMO antennas; and
a first connecting part, in an L-shape and connected to the second part and the third part.

2. The antenna system according to claim 1, further comprising:
an IoT antenna, arranged on the other side of the second group of MIMO antennas, and the IoT antenna is provided with an L-shaped structure parallel to the base; and
a GPS antenna, arranged between two of the multiple third MIMO antennas.

3. The antenna system according to claim 2, wherein the IoT antenna comprises:
a sixth part, in a long strip shape, and fixed to the base;
a seventh part, in a block shape, wherein the seventh part is parallel to the sixth part, and the seventh part is supported and fixed by the third connecting part and fourth connecting part;
an eighth part, in a II shape, wherein one end of the eighth part is electrically connected to one side of the seventh part, and the other end of the eighth part is suspended.

4. The antenna system according to claim 2, wherein the GPS antenna comprises a feeding part and a coupling grounding part, and the coupling grounding part comprises:
a grounding part, in a E-shape and fixed to the base;
a fifth connecting part, the sixth connecting part, and the seventh connecting part, with one end connected to the grounding part respectively;
a ninth part, in an L-shape, electrically connected to the other end of the sixth and seventh connecting parts, and the ninth part is parallel to the base;
a tenth part, in an L-shape, wherein one end of the tenth part is electrically connected to one end of the ninth part and the other end is suspended;
the feeding part comprises:
an eleventh part, in an L-shape, wherein the eleventh part is electrically connected to the other end of the fifth connecting part, and the eleventh part is parallel to the base;
a twelfth part, in a long strip shape, connected to one side of the eleventh part;
a thirteenth part, in L-shape, wherein one end of the thirteenth part is electrically connected to the other side of the eleventh part and the other end of the thirteenth part is suspended; and the tenth part and the thirteenth part are mutually symmetrical.

5. The antenna system according to claim 1, wherein each second MIMO antenna comprises:

four up windmill radiation patches, arranged on an upper surface of the substrate and symmetrically distributed on a first circumference;

four down windmill radiation patches, arranged on a lower surface of the substrate, and symmetrically distributed on a second circumference; a radius of the first circumference is same as a radius of the second circumference, and wind blades of the up windmill radiation patches and the down windmill radiation patch are mirrored.

6. The antenna system according to claim 1, wherein:

each up windmill radiation patch and each downwind type patch are in a 7-shaped shape;

an orientation of the four up windmill radiation patches is different from an orientation of the four down windmill radiation patches.

7. The antenna system according to claim 1, wherein:

the dielectric structure is in a hollow cylindrical shape, and a bottom of the dielectric structure is in a circular shape and arranged on the base, and four sides of the dielectric structure surround the bottom in a circular shape;

the wire structure is vertically fixed at a center position at the bottom of the dielectric structure.

8. The antenna system according to claim 1, wherein the AUX antenna comprises a first AUX antenna and a second AUX antenna, a structure of the first AUX antenna and a structure of the second AUX antenna are the same, the first AUX antenna and the second AUX antenna are both in a Z-shape, and the first AUX antenna and the second AUX antenna comprises:

a fourth part, in a long strip shape and fixed on the base;

a second connecting part, wherein one end of the second connecting part is vertically electrically connected to the fourth part;

a fifth part, in a long strip shape and provided with a T-shaped slot, wherein the fifth part is electrically connected to the other end of the second connecting part.

9. An electronic device, comprising an antenna system, wherein the antenna system is installed on a base and the antenna system comprises:

a first group of MIMO antennas, comprising multiple first MIMO antennas, wherein the multiple first MIMO antennas are respectively arranged at four corners of the base, and each first MIMO antenna is provide with a grounding structure and a fence like structure perpendicular to the base;

a second group of MIMO antennas group of MIMO antennas, comprising multiple second MIMO antennas, wherein the multiple second MIMO antennas are arranged at a middle area of the base, each second MIMO antenna is a planar structure, arranged on a substrate, and the substrate is fixed to the base through a support column and the substrate is parallel to the base;

a third group of MIMO antennas group of MIMO antennas, comprising multiple third MIMO antennas, wherein the multiple third MIMO antennas are respectively arranged on four sides of the base, and each third MIMO antenna comprises a dielectric structure and a wire structure perpendicular to the base, and the wire structure excites the dielectric structure; and an AUX antenna, arranged on a side of the second group of MIMO antennas group of MIMO antennas, and the AUX antenna is provided with a T-shaped slot parallel to the base, wherein the dielectric structure is in a hollow cylindrical shape, and a bottom of the dielectric structure is in a circular shape and arranged on the base, and four sides of the dielectric structure surround the bottom in a circular shape;

the wire structure is vertically fixed at a center position at the bottom of the dielectric structure.

10. The electronic device according to claim 9, wherein the antenna system further comprises:

an IoT antenna, arranged on the other side of the second group of MIMO antennas, and the IoT antenna is provided with an L-shaped structure parallel to the base; and a GPS antenna, arranged between two of the multiple third MIMO antennas.

11. The electronic device according to claim 10, wherein the IoT antenna comprises:

a sixth part, in a long strip shape, and fixed to the base;

a seventh part, in a block shape, wherein the seventh part is parallel to the sixth part, and the seventh part is supported and fixed by the third connecting part and fourth connecting part;

an eighth part, in a II shape, wherein one end of the eighth part is electrically connected to one side of the seventh part, and the other end of the eighth part is suspended.

12. The electronic device according to claim 10, wherein the GPS antenna comprises a feeding part and a coupling grounding part, and the coupling grounding part comprises:

a grounding part, in a E-shape and fixed to the base;

a fifth connecting part, the sixth connecting part, and the seventh connecting part, with one end connected to the grounding part respectively;

a ninth part, in an L-shape, electrically connected to the other end of the sixth and seventh connecting parts, and the ninth part is parallel to the base;

a tenth part, in an L-shape, wherein one end of the tenth part is electrically connected to one end of the ninth part and the other end is suspended;

the feeding part comprises:

an eleventh part, in an L-shape, wherein the eleventh part is electrically connected to the other end of the fifth connecting part, and the eleventh part is parallel to the base;

a twelfth part, in a long strip shape, connected to one side of the eleventh part;

a thirteenth part, in an L-shape, wherein one end of the thirteenth part is electrically connected to the other side of the eleventh part and the other end of the thirteenth part is suspended; and the tenth part and the thirteenth part are mutually symmetrical.

13. The electronic device according to claim 9, wherein the grounding structure of each first MIMO antenna comprises:

a first part, in a rectangular shape, and fixed to the base, wherein the fence like structure is vertically electrically connected to a first side of the first part through a connecting strip;

a second part, in a rectangular shape, and electrically connected to the top of the fence like structure;

a third part, in a 7-shaped shape, wherein one end of the third part is electrically connected to an opposite side of the first side, and the other end of the third part is suspended and facing one of the multiple second MIMO antennas;

a first connecting part, in an L-shape and connected to the second part and the third part.

14. The electronic device according to claim 13, wherein:
each up windmill radiation patch and each downwind type patch are in a 7-shaped shape;
an orientation of the four up windmill radiation patches is different from an orientation of the four down windmill radiation patches.

15. The electronic device according to claim 9, wherein each second MIMO antenna comprises:
four up windmill radiation patches, arranged on an upper surface of the substrate and symmetrically distributed on a first circumference;
four down windmill radiation patches, arranged on a lower surface of the substrate, and symmetrically distributed on a second circumference; a radius of the first circumference is same as a radius of the second circumference, and wind blades of the up windmill radiation patches and the down windmill radiation patch are mirrored.

16. The electronic device according to claim 9, wherein the AUX antenna comprises a first AUX antenna and a second AUX antenna, a structure of the first AUX antenna is same as a structure of the second AUX antenna, the first AUX antenna and the second AUX antenna are in a Z-shape, and the first AUX antenna and the second AUX antenna comprises:
a fourth part, in a long strip shape and fixed on the base;
a second connecting part, wherein one end of the second connecting part is vertically electrically connected to the fourth part;
a fifth part, in a long strip shape and provided with a T-shaped slot, wherein the fifth part is electrically connected to the other end of the second connecting part.

* * * * *